United States Patent [19]

Beauchamp

[11] Patent Number: 5,456,213
[45] Date of Patent: Oct. 10, 1995

[54] COMBINATION DOG LEASH AND NON-INJURIOUS CHOKE COLLAR

[76] Inventor: Christopher E. Beauchamp, 1697 Ixora Dr., Naples, Fla. 33940

[21] Appl. No.: 384,419

[22] Filed: Feb. 6, 1995

[51] Int. Cl.$^6$ ............................................. A01K 27/00
[52] U.S. Cl. ............................ 119/793; 119/864; 119/795
[58] Field of Search ........................ 119/770, 792, 119/793, 795, 797, 864; 294/141, 165, 74

[56] References Cited

U.S. PATENT DOCUMENTS

| | | | |
|---|---|---|---|
| 2,196,627 | 4/1940 | De Sanctis . | |
| 2,826,172 | 3/1958 | Buckle . | |
| 3,159,140 | 12/1964 | Miller | 119/864 |
| 3,841,542 | 10/1974 | Hogensen, Jr. | 294/141 |
| 4,550,800 | 11/1985 | Dietrich | 119/770 |
| 5,174,246 | 12/1992 | Driver . | |
| 5,325,819 | 7/1994 | Krauss . | |
| 5,329,885 | 7/1994 | Sporn . | |
| 5,351,954 | 10/1994 | Fuentes | 119/770 |

FOREIGN PATENT DOCUMENTS

| | | | |
|---|---|---|---|
| 482832 | 4/1992 | European Pat. Off. | 119/797 |
| 422362 | 3/1911 | France . | |
| 933 | of 1908 | United Kingdom . | |
| 15304 | of 1910 | United Kingdom . | |
| 859856 | 1/1961 | United Kingdom | 119/793 |
| 85/01857 | 5/1985 | WIPO | 119/793 |

OTHER PUBLICATIONS

Card attached to The Easy Hitch dog leash marketed in Colorado in 1994. copyrighted 1992.

*Primary Examiner*—Todd E. Manahan
*Attorney, Agent, or Firm*—Merrill N. Johnson

[57] ABSTRACT

A combination dog leash and non-injurios choke collar. The leash includes a six foot long strip of webbing with a clip-on device at one end of the strip for attachment to the dog's collar. At the other end of the strip of webbing is one half of a two part fixture whose other half is slidably strung onto the strip of webbing. The two parts of the fixture are designed to be easily joined together or separated by a pinching movement of the thumb and finger. A square of the webbing is sewn to the flat face of the strip of webbing about twelve inches from the end of the strip of webbing and between the two parts of the fixture. The restraining or choke collar is formed by wrapping the strip of webbing around the dog's neck and joining together the two part fixture. The collar cannot injure the dog due to the square of webbing sewn to the strip which prevents the collar from becoming small enough to actually injure the dog.

2 Claims, 1 Drawing Sheet

U.S. Patent     Oct. 10, 1995     5,456,213
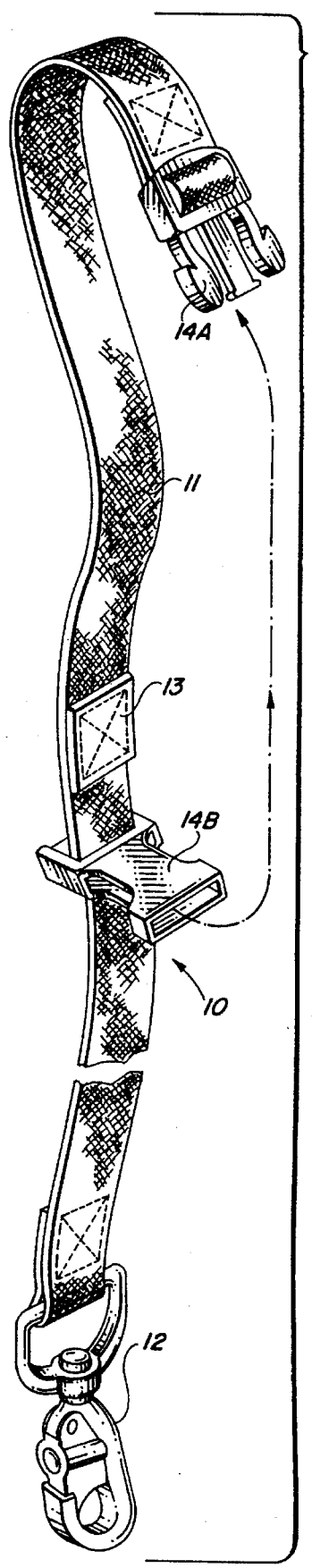
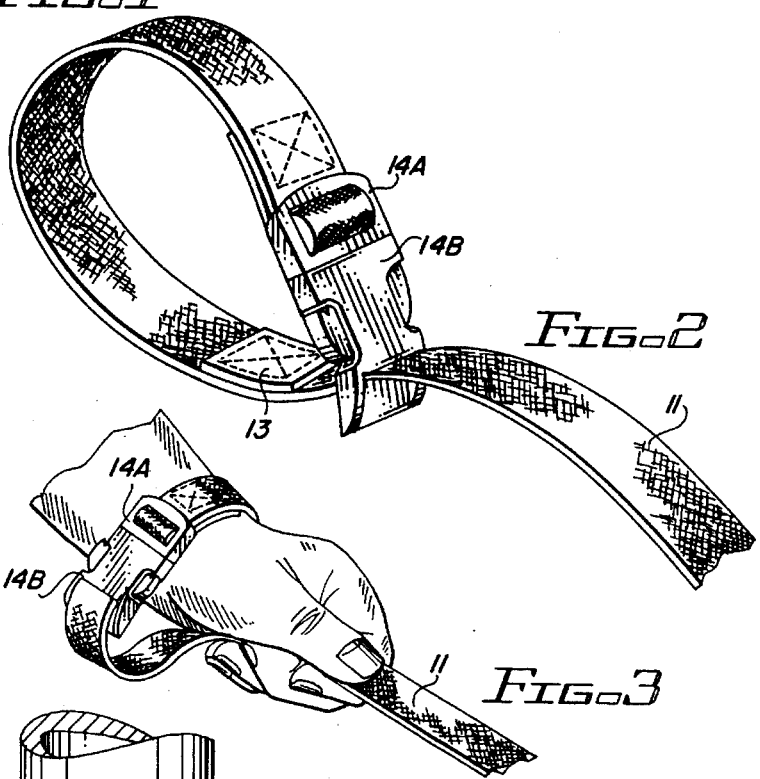
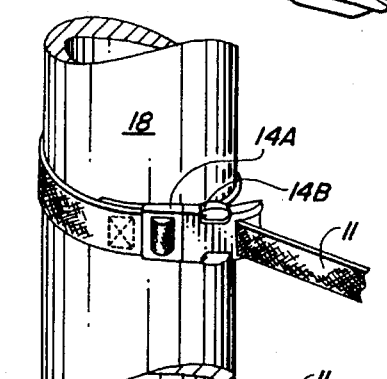
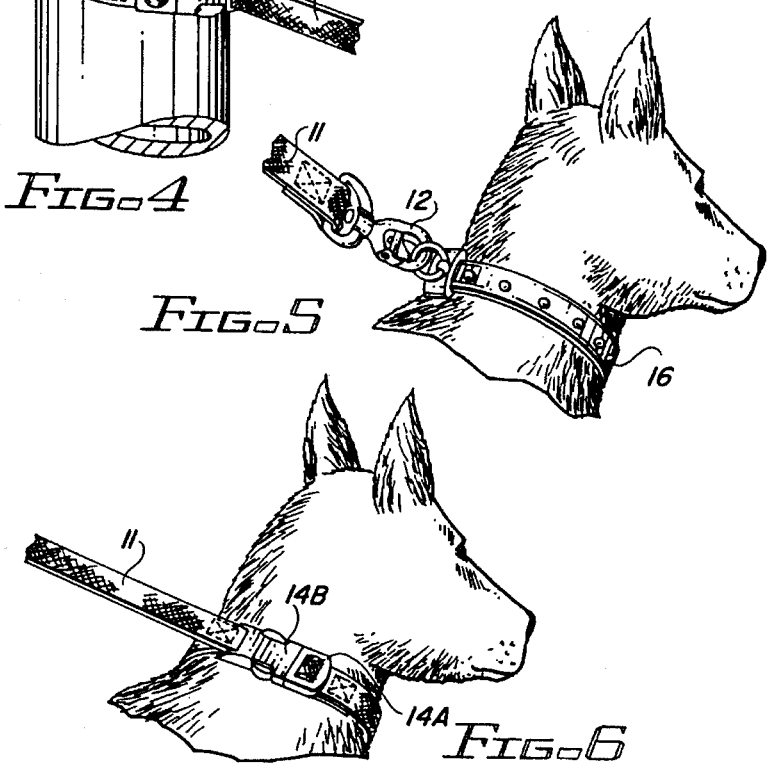

COMBINATION DOG LEASH AND NON-INJURIOUS CHOKE COLLAR

BACKGROUND OF THE INVENTION

Dog owners need a leash which serves three functions. First, a leash with a fitting on one end which can be easily and securely clipped onto the dog's regular collar and at the other end of the leash a loop to be slipped over the owner's wrist to provide a firm connection between the dog and its owner while the dog is walked.

Secondly, when the owner wishes to make a short visit into a building which the dog cannot enter, the lease should provide means for temporarily securing the leashed dog to a tree, sign post or other fixed structure.

Thirdly, when the owner is confronted with a nervous dog or one hard to control, as when taking the dog to the veterinarian, the leash should provide a non-injurious choke collar.

SUMMARY OF THE INVENTION

My unique leash includes about six feet of flexible webbing about one inch wide. Attached to one end of the webbing is a clip-on device for attachment to the ring on the dog's collar. At the other end of the webbing is one half of a two part fixture, the other half of which is slidably strung onto the webbing near the end which carries the other half of the fixture. Finally, a one inch square of the webbing is securely sewn onto the webbing of the leash at a point between the end of the leash containing half of the fixture and the slidable second half of the fixture.

When the owner or other person desires to take the dog for a walk, he or she joins the two parts of the fixture together to form a loop at one end of the leash, slips the loop over one wrist to secure the leash to the person and then clips the leash's clip-on device to the dog's collar. The dog is now ready to be walked.

When the person walking the dog desires to enter a building in which the dog is prohibited, the person locates a tree or other suitable hitching post. He then separates the two part fixture, puts that end of the leash around the post and joins the two parts of the fixture together around the post. The dog is now temporarily hitched to the post, allowing the person to enter the building and leaving the dog securely leashed to the post.

If the leashed dog is, for example, being taken to a doctor's office, where it is desired to have a firmer control over the dog, the person separates the two part fixture and puts that end of the leash around the dog's neck and joins the two parts of the fixture together around the dog's neck to form a choke collar around the dog's neck in addition to the dog's regular collar. By holding the leash at the midpoint between its two ends, the person has a restraining hold on the dog but it is impossible to injure the dog because the square of webbing sewn onto the leash will prevent the collar of webbing around the dog's neck from becoming small enough to actually injure the dog.

BRIEF DESCRIPTION OF THE DRAWINGS

The appended drawings together with the following text illustrates and describes the preferred embodiment of the invention.

FIG. 1 is a perspective view of the dog leash with its midportion broken away for convenience of illustration.

FIG. 2 is a detailed view showing the loop formed when the leash's two part fixture is clipped together.

FIG. 3 is a detailed view showing the leash's loop encircling the wrist of a person walking a leashed dog.

FIG. 4 is a detailed view showing the leash's loop encircling a post.

FIG. 5 shows the leash clipped to a dog's collar.

FIG. 6 shows a dog restrained by the leash's non-injurious choke collar.

DETAILED DESCRIPTION OF THE PREFERRED EMBODIMENT

FIG. 1 shows dog leash 10 which includes a six foot long strip of webbing 11 which measures one inch wide and ⅛th of an inch thick. At one end of webbing 11 is a clip-on device 12 for attachment to the ring on a dog's collar 16 as shown in FIG. 5.

At the opposite end of webbing 11 is a two-part fixture whose parts are labelled 14A and 14B. As shown in FIGS. 1 and 2 part 14A is permanently affixed to the end of webbing 11 and part 14B is slidably strung onto webbing 11. This two part fixture is a plastic side release buckle made by Illinois Tool Works and sold under the trade name TUFF™. The fixture is made of high impact plastic and designed to be easily joined together or separated by a pincher movement of the thumb and finger.

Located between parts 14A and 14B of the two part fixture is a square 13 of webbing as shown in FIGS. 1 and 2 securely sewn to webbing 11 located twelve inches from the end of the leash between two parts 14A and 14B of the fixture. So located, square 13 serves as a stop which, when this end of the leash is used as a restraining or choke collar, prevents part 14B from sliding so close toward the end of webbing 11 that it will injure the dog.

The web loop formed by clipped together parts 14A and 14B can also be used to secure leash 10 to the person walking the dog by slipping the loop over the person's wrist as shown in FIG. 3. In addition, the loop can be used to secure the leashed dog to a post 18 as shown in FIG. 4.

Most importantly, the web loop can be used as a non-injurious choke collar for a dog by itself as shown in FIG. 6 or together with the leash also clipped onto the dog's collar.

While having shown and described the preferred embodiment of the invention, no limitation of the scope of the invention should implied from the foregoing description since the spirit and scope of the invention is defined only by the following claims.

I claim:

1. A combination dog leash and non-injurious choke collar comprising:

a strip of webbing about six feet in length, about one inch wide and ⅛th of an inch thick, a clip-on device attached to one end of the strip of webbing, a two part fixture, one half of which is attached to the other end of the strip of webbing and the other half of the fixture being slidably strung onto the strip of webbing, the two parts of the fixture designed to be joined together or separated by a single movement of the hand, and
a square of the webbing sewn onto the surface of the strip of webbing located about twelve inches from the end of the strip to which is attached one half of the fixture and further located between the two parts of the fixture.

2. A combination dog leash and non-injurious choke collar as set forth in claim 1 in which the two part fixture is a plastic side release buckle.

* * * * *